United States Patent Office 3,434,856
Patented Mar. 25, 1969

3,434,856
SINGLE-STAGE PROCESS FOR MAKING
PAVING MIXES
Alan A. Goldstein, San Rafael, Calif., assignor to Chevron
Research Company, a corporation of Delaware
No Drawing. Filed May 25, 1964, Ser. No. 370,083
Int. Cl. C08h *13/00;* C09d *3/24*
U.S. Cl. 106—277                                    4 Claims This invention relates to an improvement in the preparation of paving mixes of emulsified asphalt and mineral aggregate. U.S. Patent application Ser. No. 370,109 filed on the same date of May 25, 1964 by the same applicant, now abandoned, describes and claims a two-step process for preparing paving mixes of emulsified asphalt and mineral aggregate, whereby an excellent coating of asphalt binder is obtained on the surface of aggregate particles. In this two-step process the aggregate, whether a dense-graded aggregate or sand, is precoated with a solution of asphaltenes, whereupon the asphaltene-coated aggregate is mixed with a paving emulsion of asphalt of either anionic or cationic type.

Asphaltenes which are highly molecular condensed-ring solid materials consisting chiefly of carbon and hydrogen as well as of some oxygen, sulfur and nitrogen, are obtained by solvent treatment of asphalt-type bituminous materials, such as natural asphalts, cracked tars, vacuum- and steam-distilled crude oils, and so forth. By applying light paraffinic solvents to said bituminous materials, solid "asphaltenes" are separated (settled out) from the remaining fluid portion of "petrolenes." Asphaltenes dissolve readily in aromatic hydrocarbon solvents, such as benzene, toluene, and xylene, and in carbon tetrachloride, carbon disulfide, etc., as well as in mixtures of such solvents. They are, however, only colloidally dispersible in cycle oil fractions obtained in petroleum refineries during the cracking treatment of crude oil. These cycle oils quite frequently contain substantial proportions of aromatic hydrocarbons, such as 39–40% and higher. In mixtures of these light cycle oils with the aforementioned solvents (xylene, etc.), as well as in mixtures of cutter stock naphtha with these solvents, in a weight ratio of from 40:60 to 60:40, asphaltenes become dissolved in the lighter solvent (e.g., xylene), and are simultaneously suspended in light cycle oil or in naphtha.

It would have been highly desirable to be able to apply the asphaltenes to mineral aggregates simultaneously with an asphalt paving emulsion and thus to achieve the wanted improvement in coating effectiveness in one single step, and to produce a good paving mix endowed with good cohesive strength and unlikely to suffer embrittlement or powdering of the asphalt binder film.

Asphaltenes are known to be insoluble in water and in aliphatic hydrocarbon solvents, such as pentane and the like. Furthermore, asphaltenes upon being dissolved in aromatic solvents, for instance in benzene and zylene, as well as in carbon tetrachloride, were noted not to interfere with the production of a satisfactory coating of asphalt on the aggregate, when added to an asphalt emulsion in the absence of naphtha and/or light cycle oil. However, quite disappointingly, the resulting paving mix lacked the desired cohesive strength and the asphalt binder film tended to crumble to powder with time.

In view of the aforementioned failure of aromatic hydrocarbon solvents and other like organic solvents for asphaltenes to contribute to the production of satisfactory paving mixes of emuslified asphalt and aggregate, the problem of introducing successfully asphaltenes into paving asphalt emulsions, to facilitate mixing with and coating of mineral aggregate by emulsified asphalt to produce satisfactory paving mixes, did not suggest an easy solution.

The present application does offer such a solution. As distinguished from the aforedescribed application of a two-step process, it describes and claims a single-stage process for preparing paving mixes of aggregate and emulsified asphalt. In this process the asphaltenes which are believed to be responsible for an improved coating of the aggregate are introduced into a paving asphalt emulsion directly and preferably immediately prior to the mixing of the emulsion with mineral aggregate.

This is done by dissolving the asphaltenes in an appropriate solvent mixture therefor and by adding the solution to the asphalt emulsion, which can then be used for mixing with the aggregate.

According to the present invention, asphaltenes are introduced into an asphalt emulsion in the presence of (1) a light organic solvent for asphaltenes, such as a low molecular weight aromatic hydrocarbon, and (2) a heavier hydrocarbon medium or solvent, in particular cutter stock naphtha or light cycle oil. When an asphalt emulsion containing so introduced asphaltenes is then mixed with mineral aggregate (whether dense graded or sand), the resulting paving mix displays excellent coating on the aggregate, greatly enhanced cohesive strength and good texture.

Asphaltenes can be added to an asphalt paving emulsion in a mixture of a light solvent, such as an aromatic hydrocarbon or carbon tetrachloride and a heavier hydrocarbon solvent or dispersant, such as cutter stock naphtha or light cycle oil; or the asphaltenes are added to a paving asphalt emulsion containing naphtha or light cycle oil in solution in a light solvent, e.g., benzene, toluene, xylene or $CCl_4$; or yet, the asphaltenes are added to a paving asphalt emulsion in solution in a light solvent, and naphtha or cycle oil is added either simultaneously or promptly thereafter to the emulsion.

The asphaltenes are dissolved in enough volatile solvent therefor to make available from about 5.0 to about 15.0% by weight of asphaltenes in an asphalt emulsion, based on the weight of the whole emulsified asphalt composition to be used for coating the aggregate, and in a mixture of light solvent and a heavier solvent in the weight ratio of from 40:60 to 60:40. Asphalt emulsions in the single-stage process of the present invention are paving-type asphalt emulsions, that is, ones having an asphalt residue or content of from about 50 to about 70%. These emulsions are prepared either with the aid of a cationic emulsifier or an anionic emulsifier, the amount of the emulsifier conventionally being in the range from about 0.15 to about 3.0% by weight, based on the emulsion. The aggregate, which may be either a densely-graded type of aggregate or sand, may be either dry or wet. In addition, there may be added to the emulsion a surfactant other than the primary emulsifier, for instance a surface-active material, such as N-tall oil 1,3-propylene diamine, and also an adhesion agent, e.g., dodecyl aniline. These surfactants and adhesion agents may be either dispersed in the solution of asphaltenes and introduced therewith into the asphalt emulsion, or they may be added separately as such into the emulsion.

The aggregate for use in the paving mixes prepared in accordance with the invention, as mentioned already, is either of the dense-graded type or sand. The operativeness of the process of the present invention and the improvement in the properties of the paving mixes prepared thereby has been tested in numerous series of tests in accordance with a specially-designed "Mixing Test." This test determines the ability of an emulsion to mix with and to coat particles of dense-graded aggregate thoroughly and uniformly, at the same time providing a measure of the tendency of asphalt binder to strip off during the mixing period. A predetermined amount of the aggregate is moistened with water (about 7% by weight of the aggregate) and placed into a metal kitchen bowl about 12" in diameter at the top and 6" deep at the center, using a metal spoon about 10" long. The asphalt emulsion is added to the aggregate, and the whole stirred vigorously with the spoon for two minutes. The resulting mass is placed on a paint can lid 6" in diameter and about 5/8" deep and left to cure for 24 hours at room temperature. Then the sample is inspected to determine (a) percentage of surface area covered on stones of 3/8" and larger in size, (b) percentage of surface area covered on stones and aggregate particles smaller than 3/8" in size. The average color of the mix is also observed, whether gray, tan or black. Finally, a qualitative rating of good, fair or poor is assigned to the textural and cohesive qualities of the mix. A mix which is dry and tends to break up with powdering of the binder film obviously lacks cohesive strength. Neither is considered satisfactory a mix which is too soft and pliable.

A number of such mixing tests have been carried out using preformed asphalt emulsions which contained added asphaltenes dissolved in a variety of solvent mixtures, such as a mixture of carbon tetrachloride and light cycle oil, a mixture of bnezene and light cycle oil, a mixture of xylene and light cycle oil, a mixture of naphtha cutter stock and light cycle oil, etc.

In one series, the tests were made using as a representative emulsion a cationic emulsion of about 65% asphalt residue, emulsified in water with about 0.5% by weight of n-$C_{14}$–$C_{18}$-alkyl trimethyl ammonium chloride, sold under the trademark "Arquad T-50." The emulsion contained no added cutter stock naphtha. On the other hand, 0.22% (based on the final emulsion) of a surfactant, namely, N-tall oil 1-3, propylene diamine and 0.44% of an adhesion agent, namely, p-phenylene diamine, were also added to the emulsion along with the solution of asphaltenes. In the following Table I are shown the results of mixing tests with dense-graded aggregate. The aggregate was dense-graded aggregate of California origin (Cache Creek), and it was used in the tests in amounts equal to 500 g. per each 30 g. of asphalt emulsion. In each run to a 30 g. sample of this emulsion there was added 5 g. of asphaltenes dispersed or dissolved in 10 g. of different solvents or solvent mixtures.

It is plainly apparent that the coating with asphaltene-containing emulsions exceeded all expectations and was far superior to the coating possible with the same emulsions but without asphaltenes. Moreover, the textural appearance of the resulting paving mixes and their cohesive strength were likewise very good. The same table, however, shows that omission from the solvent mixture of either the light solvent component or of the heavier solvent component, tended to affect adversely the properties of the paving mixes prepared by mixing mineral aggregate with asphalt emulsions containing the so dispersed asphaltenes.

The same table shows that upon addition of asphaltenes, without their being reduced to microscopic dimensions (dissolved) in a light hydrocarbon solvent, such as xylene (Run Number 5), the coating was less complete, the texture was quite poor and cohesive strength of the mix was very low. Addition of a surfactant to a preformed asphalt emulsion is not a prerequisite for the operativeness, and the surface-active emulsifier already present in the asphalt emulsion is sufficient to facilitate the penetration of asphaltenes together with the asphalt to the surface of the aggregate. The same is true of the addition of adhesion additives, their presence being entirely optional and their absence not affecting adversely either the coating or other characteristics of the paving mix. As a matter of fact, as shown by the results of Run Number 6, the resulting coating on the aggregate particles covered as much as 90–95% of the aggregate surface, and both the texture and the cohesive strength were excellent.

Surprisingly, one of the controlling, critical conditions for the optimal operation of the process of the invention is found to be the presence in the asphalt emulsion of a heavier hydrocarbon solvent medium, such as cutter stock naphtha or light cycle oil, along with a lighter solvent known to dissolve the asphaltenes. This is wholly unexpected, since both the insolubility of asphaltenes in water and in aliphatic hydrocarbon solvents, such as butane or pentane, tended to suggest in the past avoiding using such media as naphtha and cycle oils with asphaltenes. The solvent mixture must comprise at least 40% by weight of naphtha or cycle oil to effect good coating of the aggregate by asphalt binder and to produce a paving mix with good textural and cohesive qualities.

Another critical requirement of the process is that the proportions of asphaltenes be higher than 10% and preferably from about 11 to about 15% by weight, based on the weight of the asphaltene-treated composition. In fact, in the tests of coating dense-graded aggregate, using the same cationic paving asphalt emulsion (about 65% asphalt residue) containing added thereto about 11% by weight of asphaltenes, about 11% of naphtha cutter stock and about 11% of xylene, based on the weight of the final composition for use in mixing with the aggregate, on decreasing the asphaltene content in the test sample by a mere 12% (4.4 g. instead of 5 g.) a drastic reduction in the extent of the surface of the aggregate coated with asphalt was observed. A reduction of from 90 to 30% was noted in the case of aggregate of 3/8" and larger in size, and a reduction from 95 to 70% was observed in the case of aggregate smaller than 3/8". Cohesive strength and textural appearance also did suffer.

As regards the criticality of the content of the mixture of solvents or dispersing media for asphaltenes, present in the coating emulsion, that content may be varied from about 0.8 to about 1.2 of the weight of asphaltenes, without seriously affecting the quality of the final paving mix. The less of the lighter solvent medium is used, however, the more pronounced is the tendency of the asphalt- TABLE I.—MIXING PERFORMANCE OF ASPHALT EMULSION CONTAINING COLLOIDALLY DISPERSED ASPHALTENES

| Asphaltene Content | Solvent Used | Weight Ratio of Solvent Components | Percent Coating on— | | Cohesive Strength | Textural Appearance |
|---|---|---|---|---|---|---|
| | | | Stones 3/8"+ | Stones <3/8" | | |
| Run No.: | | | | | | |
| 1 ......... 5 g. in 10 g. of Solvent. | Light Cycle Oil+$CCl_4$ | 50:50 | 100 | 100 | Excellent | Excellent. |
| 2 ............ do ...... | Light Cycle Oil+$C_6H_6$ | 50:50 | 65 | 85 | Good | Good. |
| 3 ............ do ...... | Light Cycle Oil+$C_6H_4(CH_3)_2$ | 50:50 | 85 | 95 | ..... do ............. | Do. |
| 4 ............ do ...... | Light Cycle Oil+$C_6H_5.CH_3$ | 50:50 | 75 | 95 | ..... do ............. | Do. |
| 5 ............ do ...... | Light Cycle Oil | | 65 | 65 | Extremely poor... | Extremely poor. |
| 6 [1] .......... do ...... | Cutter Stock Naphtha+$C_6H_4(CH_3)_2$ | 50:50 | 90 | 95 | Excellent | Excellent. |
| 7 ............ do ...... | Cutter Stock Naphtha | | 75 | 75 | Poor | Poor. |
| 8 ............ do ...... | $C_6H_4(CH_3)_2$ | | 55 | 85 | ..... do ............. | Do. |
| 9 ............ | Cutter Stock Naphtha+$C_6H_4(CH_3)_2$ | 50:50 | 20 | 60 | Good | Do. |
| 10 ............ | Cutter Stock Naphtha | | 40 | 65 | Fair | Do. |

[1] No Additional Surfactant nor Adhesion Agent used in this run.

enes to settle out from the emulsion. A particular advantage of the process of the present invention lies in that it permits reducing the asphalt content of the paving mix by as much as 15%, without noticeably affecting its quality. This is shown by the results of another series of tests in the next Table II. The emulsion in the test series of Table II was the same representative cationic paving asphalt emulsion as in the series of Table I, but no surfactant other than the primary emulsifier "Arquad T-50" and no adhesion agent was used. In each run, the emulsion sample received an addition of 5 g. of asphaltenes dispersed or dissolved in 10 g. of a 50:50 mixture of cutter stock naphtha and xylene. However, if the asphalt content is reduced below about 15%, a somewhat softer and more pliable paving mix will be obtained, and this may be undesirable under the circumstances. In order to forestall a possible tendency of the asphaltenes to settle out from the asphalt emulsion on standing prior to being mixed with the aggregate, as it may happen when the content of either solvent medium (light aromatic solvent, such as xylene, or heavier dispersing medium, such as naphtha) in their mixture is at its operative minimum, it may be advantageous to remill the emulsion before applying it to the aggregate.

TABLE II.—EFFECT OF DECREASING ASPHALT CONTENT OF EMULSION CONTAINING ASPHALTENES IN A MIXTURE OF NAPHTHA AND XYLENE

| Emulsioning: | Asphalt in Emulsion g. | Percent Coated on— | | Cohesive Strength | Textural Appearance |
|---|---|---|---|---|---|
| | | Stones of ⅜"+ | Stones ⅜" | | |
| 30.0 | 19.5 | 90 | 95 | Excellent | Good. |
| 28.5 | 18.5 | 90 | 95 | ___do___ | Do. |
| 26.9 | 17.5 | 75 | 95 | Good | Do. |
| 25.4 | 16.5 | 80 | 95 | Fair | Fair. |
| 23.8 | 15.5 | 70 | 90 | Poor | Poor. |
| 22.5 | 14.5 | 75 | 90 | ___do___ | Do. |

¹ Same emulsion as in Table I.

Thus, the invention provides a composition eminently suitable for the production of paving mixes of emulsified asphalt and mineral aggregate and consisting essentially of a paving-type asphalt emulsion of from about 50 to about 70% by weight of asphalt, from about 5 to about 15%, by weight of this emulsion, of asphaltenes, and from about 10 to about 30% by weight of a mixture of (1) a solvent for asphaltenes and (2) a hydrocarbon dispersant therefor, which is preferably cutter stock naphtha or light cycle oil, the weight ratio of these solvents to each other being from 40:60 to 60:40.

When this composition is intimately mixed with mineral aggregate commonly used in the paving trade, such as dense-graded aggregate and sand, in proportions of from 2.5 to 15.0% by weight, based on the weight of the aggregate (dry), in accordance with the known mixing techniques of the paving art, the resulting paving mixes display an excellent asphalt coating on the aggregate, good cohesive strength, and likewise an excellent textural appearance.

Of course, in addition to the essential components of the aforementioned composition for the preparation of mixes of emulsified asphalt with mineral aggregate, it may contain other conventional additives to asphalt emulsions used in the art in small amounts to improve or modify in the desired direction certain characteristics of such emulsions. These additives may include antistripping agents, thickening agents, auxiliary emulsifiers or stabilizers, etc., provided, of course, that the presence of these additives does not impair the beneficial action of asphaltenes and solvents in accordance with the invention.

In concluding, it is to be understood that the invention is not limited to any specific paving asphalt emulsions, emulsifiers, solvents or additives, whether employed in the examples or mentioned elsewhere in the above specification, the examples being offered only as illustrations of operativeness of the invention. Accordingly, it is limited only by the definitions given in the following claims.

I claim:

1. An asphalt composition suitable for the preparation of paving mixes of emulsified asphalt and mineral aggregate, consisting essentially of (1) a paving emulsion of asphalt-in-water, characterized by an asphalt content from about 50 to about 70% by weight, from about 0.15 to about 3% by weight emulsifier and a minor proportion of water; (2) from about 5 to about 15% by weight of asphaltenes, and (3) from about 10 to about 30% by weight of a mixture of a light solvent for said asphaltenes selected from the group consisting of aromatic hydrocarbon solvents and carbon tetrachloride and a heavier hydrocarbon solvent selected from the group consisting of cutter stock naphtha and light cycle oil, the weight ratio of said light solvent to said heavier hydrocarbon solvent being in the range from 40:60 to 60:40.

2. A single-step process for the preparation of paving asphalt-aggregate mixes, which consists in mixing the aggregate with a paving asphalt emulsion comprising from about 5 to about 15% by weight of asphaltenes dispersed in said emulsion, and further comprising a mixture of a light solvent for such asphaltenes selected from the group consisting of aromatic hydrocarbon solvents and carbon tetrachloride and a heavier hydrocarbon solvent selected from the group consisting of cutter stock naphtha and light cycle oil, said mixture of solvent being present in an amount from about 10 to about 30% by weight, based on the emulsion and the weight ratio of said light solvent to said heavier hydrocarbon solvent being from 40:60 to 60:40, said paving asphalt emulsion comprising asphalt in water having an asphalt content from about 50 to about 70% by weight, from about 0.15 to about 3.0% by weight emulsifier and a minor proportion of water, the paving asphalt emulsion, asphaltenes and mixed solvents amounting to from about 2.5 to 15.0% by weight based on the weight of the dry aggregate.

3. A process as defined in claim 2 wherein said light solvent for asphaltenes is xylene and said heavier hydrocarbon solvent is cutter stock naphtha.

4. A process as defined in claim 2 wherein said light solvent is xylene and said heavier hydrocarbon solvent is light cycle oil.

References Cited

UNITED STATES PATENTS 2,349,445    5/1944    McGrane _____ 106—280
2,366,657    1/1945    Sorem _____ 106—273

DONALD J. ARNOLD, *Primary Examiner.*

J. B. EVANS, *Assistant Examiner.*

U.S. Cl. X.R.
106—283; 252—311.5